United States Patent [19]

Weidler

[11] 4,102,378

[45] Jul. 25, 1978

[54] TIRE CHAIN

[76] Inventor: Erhard Alfred Weidler, Jahnstrasse 37, 7080 Aalen 1, Fed. Rep. of Germany

[21] Appl. No.: 707,820

[22] Filed: Jul. 22, 1976

[30] Foreign Application Priority Data

Jul. 25, 1975 [DE] Fed. Rep. of Germany ....... 2533832

[51] Int. Cl.² .............................................. B60C 27/06
[52] U.S. Cl. .......................................... 152/243; 59/85
[58] Field of Search ....................... 152/243, 244, 245; 59/85, 84, 89

[56] References Cited

U.S. PATENT DOCUMENTS

| 975,323 | 11/1910 | Brown | 59/85 UX |
|---|---|---|---|
| 1,229,244 | 6/1917 | Eckert | 152/244 X |
| 1,617,763 | 2/1927 | King | 59/89 |
| 1,670,528 | 5/1928 | Carpenter | 152/243 |
| 2,480,788 | 8/1949 | St. Pierre | 59/85 X |
| 3,132,395 | 5/1964 | Luketa | 59/85 X |
| 3,139,720 | 7/1964 | Robbins | 59/84 |

Primary Examiner—Robert B. Reeves
Assistant Examiner—Francis J. Bartuska
Attorney, Agent, or Firm—Parmelee, Johnson, Bollinger & Bramblett

[57] ABSTRACT

A tire chain having annular links and C-shaped links which are hooked into said annular links wherein one of the ends of the C-shaped link has a cross section which is decreased at the expense of its width thereby defining an introduction slot. The annular link has at least one narrowing whose shape corresponds to the shape of the end of the C-shaped link with the reduced cross section and retaining elements for the C-shaped link are provided in the narrowing. The retention elements are provided in the narrowings to prevent disconnection of the joined links.

1 Claim, 8 Drawing Figures

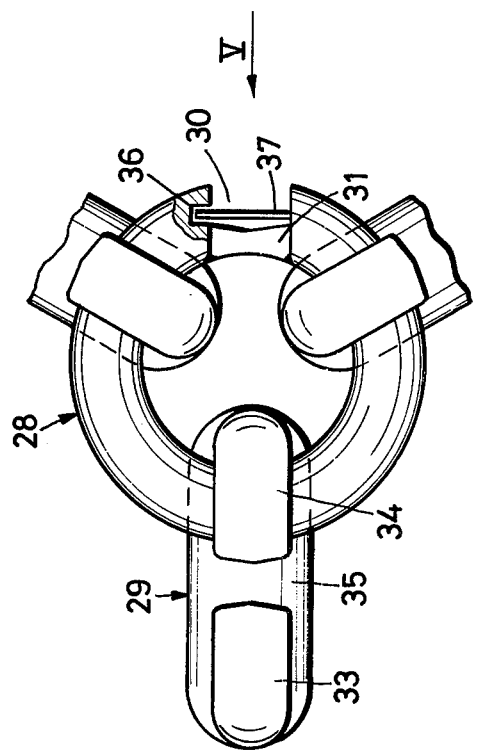

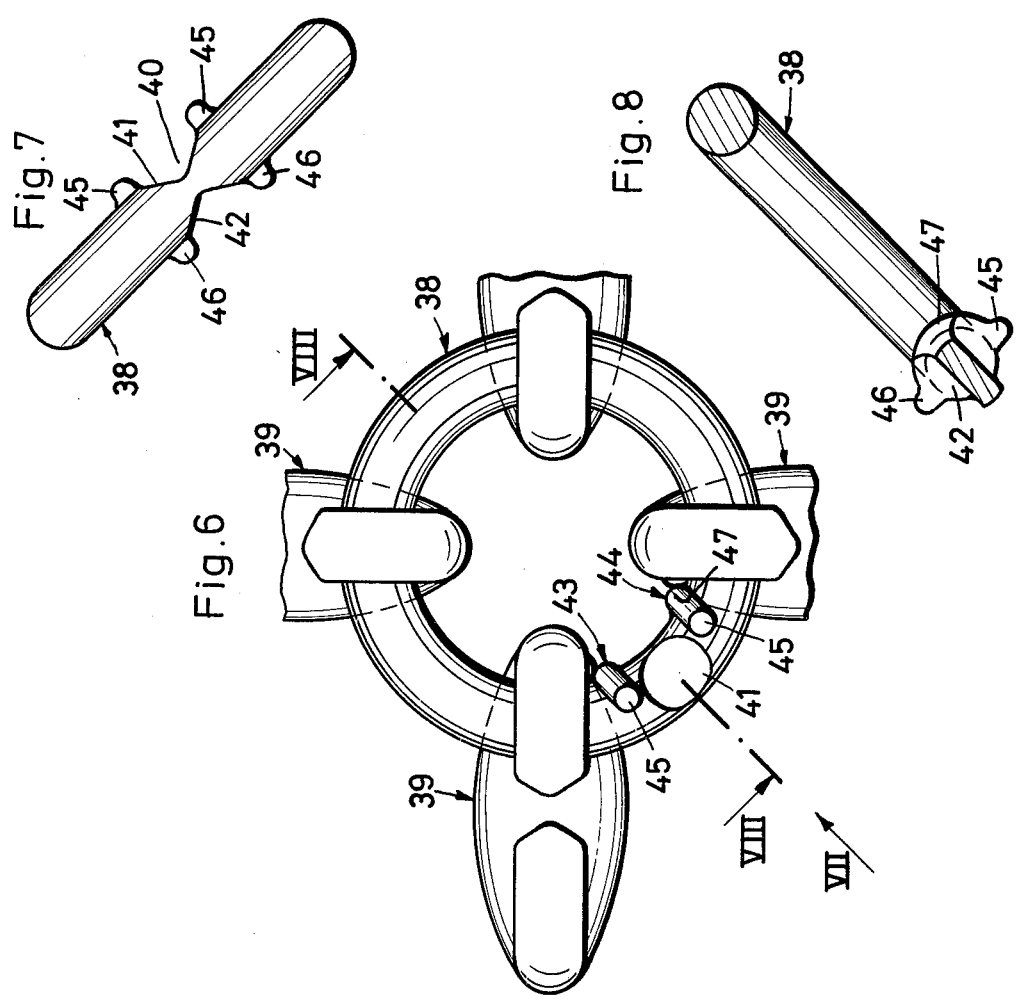

TIRE CHAIN

The present invention relates to a tire chain having a chain network which consists, at least in part, of annular links which are oriented parallel to the surface of the tire and C-shaped links oriented vertical to the surface of the tire and capable of being hooked into said annular shaped links.

Tire chains of the above type can be manufactured without the use of chain welding machines and make it possible to replace damaged or worn links in a particularly simple manner.

Tire chains of the above-mentioned type are known in which it is necessary to apply locking elements after the annular links have been connected to the C-shaped links. Such locking elements must be attached to the annular link or the C-shaped link by welding, shrinkage, pinning, or threading. The mounting and removal of the locking elements in the case of the known tire chains is relatively costly.

The object of the present invention is to create a tire chain of the type in question whose tread network consists of the smallest possible number of different simple parts which do not unintentionally become loose after they have been placed together, without special locking elements being required in order to hold them together. This object is achieved in accordance with the invention in the manner that at least one of the ends of the arms of the C-shaped link which define its introduction slot has a cross section which is decreased at the expense of the width of the end, that the annular link has at least one narrowing whose shape corresponds to the shape of the end of reduced cross section, and that holding means for the C-shaped link which is hooked into the annular link are provided in the region of the narrowing.

The tire chain of the invention has the advantage that special locking elements for preventing the unintentional detachment of the links of the network can be dispensed with. As a result of the development of the narrowing and of the ends of the arms of the C-shaped link, only short paths of introduction are required, which make it possible to keep the inner length and inner width of the individual structural parts small, and in this way increase their insensitivity to breakage. The small dimensions of the structural parts, furthermore, favor the development of dense chain networks with a plurality of gripping elements.

It has been found particularly advantageous for both ends of the arms of the C-shaped links to be limited by wedge surfaces arranged in roof shape whose apices lie in the central plane passing through the arms and the back part of the C-shaped link, and for the narrowing of the annular link to be formed of two notches having limiting surfaces arranged in X-shape.

The narrowing of the annular link should in this connection extend as parallel as possible to the central plane of the annular link, since in this way the cross-sectional regions subjected to the highest stresses remain unweakened.

The invention will be explained in further detail below with reference to the accompanying drawings, in which:

FIG. 4 is a top view, corresponding to FIG. 2, of an annular link to which three C-shaped links are connected;

FIG. 5 is a view of the annular link of FIG. 4 seen in the direction of the arrow V in FIG. 4;

FIG. 6 is a top view, corresponding to FIGS. 2 and 4, of an annular link of modified embodiment having four C-shaped links attached thereto;

FIG. 7 is a view of the annular link of FIG. 6 seen in the direction of the arrow VII; and FIG. 8 is a section through the annular link of FIG. 6 along the line VIII—VIII of FIG. 6.

Figure 3:
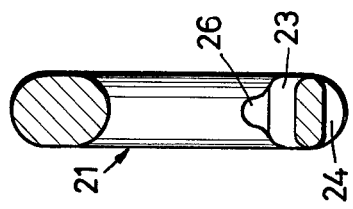
FIG. 3 is a section along the line III—III of FIG. 2.
Figure 1:
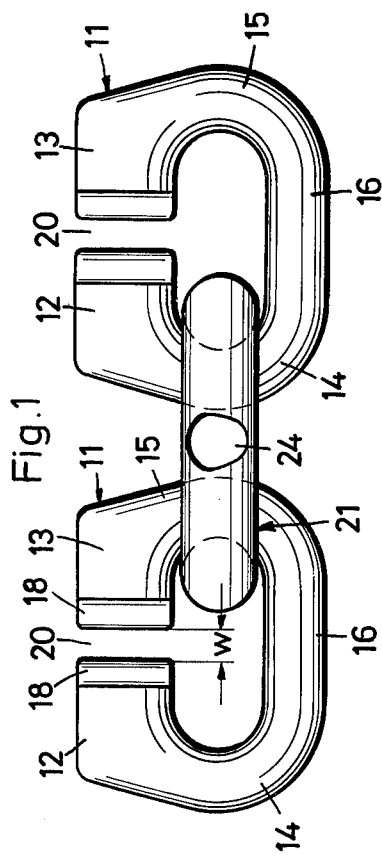
FIG. 1 is a side elevation of two C-shaped links connected together by an annular link.
Figure 2:
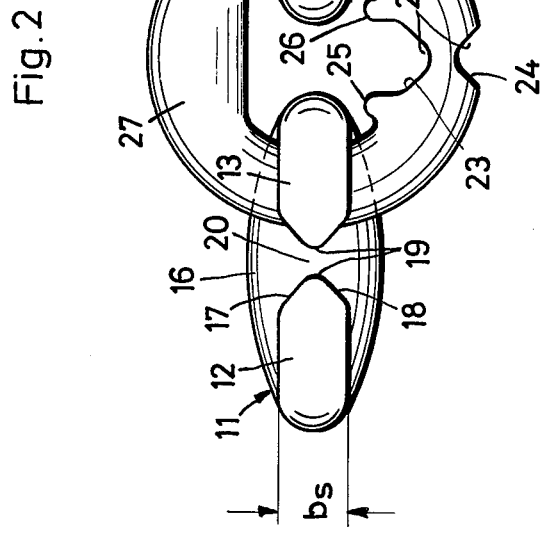
FIG. 2 is a top view of the links shown in FIG. 1.

Referring to FIGS. 1 to 3, 11 are two C-shaped links whose arms 12 and 13 are connected, via two bends 14 and 15, with a widened back part 16. The cross section of the ends of the arms 12 and 13 is reduced at the expense of the width $b_s$. Each of the ends have two wedge surfaces 17 and 18 which are arranged in roof shape and the vertices 19 of which lie in the central plane extending through the arms 12 and 13 of the back part 16.

The distance between the vertices 19 determines the minimum width $w$ of the introduction slot 20 of the C-shaped links. As can be noted in particularly clear manner in FIG. 2, the wedge-shaped surfaces 17, 18 of each end of the arms 12 and 13, which surfaces define the introduction slot 20 and are arranged substantially in X-shape, form an angle with each other of about 90°.

Annular links 21 serve to connect the C-shaped links 11. Each annular link is provided with a narrowing 22 which is formed by two notches 23 and 24. In the region of the narrowing 22, in the direct vicinity thereof, there are arranged retaining elements 25, 26 which prevent the unintended detachment of the C-shaped links 11 from the annular link 21. The retaining elements 25, 26 have the shape of projections directed towards the inside of the annular link 21. These projections limit the swinging motion of the C-shaped links 11 with respect to the annular link 21. The notches 23 and 24 have limiting surfaces which are also arranged in X-shape and form an angle which corresponds to the angle which the wedge surfaces 17 and 18 form with respect to each other.

A reinforcement 27 is provided on the side of the annular link 21 opposite the narrowing 22.

In the embodiment shown in FIG. 4, three C-shaped links 29 whose construction is substantially the same as the C-shaped links 11 are connected with one annular link 28. The annular link 28 has a narrowing 30 on one side. In the region of the narrowing, the annular link is provided with retention elements 31 and 32 which protrude beyond the top and bottom sides of the annular link. As can be noted from FIG. 5, the width of the retention element 32 is less than the width of the retention element 31. The difference between the width of the retention elements takes into consideration the difference in width between the arms 33 and 34 on the one hand and the back part 35 of the C-shaped links 29, on the other hand.

Within the region of the narrowing, there is furthermore arranged a spring 37, the ends of which engage into two opposite slits 36, which spring can be pressed against the bottom of the narrowing 30 by the end surfaces of one of the arms 33, 34 of the C-shaped links upon the introduction of the latter. The spring is connected in undetachable manner with the annular link 28 and constitutes an additional retention element.

An annular link 38, having connected thereto four C-shaped links 39 whose construction corresponds substantially to that of the C-shaped links 11, is shown in FIGS. 6 to 8. The annular link 38 is also provided with a narrowing 40 which is formed by two notches 41 and 43. While the notches 23 and 24 as well as 30, however, extend perpendicular to the central plane of the annular links 21 and 28, respectively, the notches 41 and 42 are arranged parallel to the central plane of the annular link 38. This arrangement affords advantages in strength, since in this case the notches lie in the region of the annular link 38 which is subjected to the least stress.

Retention elements 43 and 44 are provided in the region of the narrowing 40 also in the case of the embodiment shown in FIGS. 6 to 8. The retention elements have projections 45 and 46 which protrude above and below the circumferential surface of the annular link 38 and are connected with each other by a bead 47 which extends towards the inside of the annular link 38.

In all the embodiments described, when the C-shaped links are introduced into the annular links, certain movements are carried out which are so selected that the probability of their occurring during the use of the tire chain is practically zero. This means no more or less than that unintentional detachment of the C-shaped links from the annular links is virtually impossible. If no value is placed on the taking apart of a chain formed by the interconnecting of annular links and C-shaped links, it is also possible to apply one or more welding beads to bridge over the narrowings after the C-shaped links have been attached to the annular links.

What is claimed is:

1. Tire chain having a chain network which comprises, at least in part, annular links oriented parallel to the surface of the tire and C-shaped links which are oriented vertically to the surface of the tire and can be hooked in said annular links, characterized by the fact that at least one of the ends of the arms of the C-shaped link which limit the introduction slot of the latter has a cross section which is reduced at the expense of the width of the end; that the annular link has at least one narrowing the shape of which corresponds to the shape of the end of reduced cross section; and that retaining elements for the C-shaped link which has been attached to the annular link are present in the region of the narrowing; wherein the narrowing of said annular link is formed of two notches with limiting surfaces arranged in X-shape, one of said notches extending parallel to the central plane of said annular link, and said retention elements are formed of inserts which are inserted into said narrowing.

* * * * *